March 22, 1949.   F. L. LADE ET AL   2,465,236
BOILER FLUE CLEANER
Filed Nov. 21, 1945

INVENTORS
FREDERICK L. LADE
CHARLES J. SIMMONS
ATTORNEY

Patented Mar. 22, 1949

2,465,236

UNITED STATES PATENT OFFICE 2,465,236

BOILER FLUE CLEANER

Frederick L. Lade and Charles J. Simmons,
Vancouver, British Columbia, Canada

Application November 21, 1945, Serial No. 629,934

2 Claims. (Cl. 15—104.055)

Our invention relates to improvements in boiler flue cleaners.

The object of the invention is to provide means whereby an annular jet of steam may be obtained and projected onto the coated scale lining of a tube at such an angle as to ensure the lifting of any scale from the tube surface without having to resort to percussion chipping devices. A further object is to provide a simple means for closely regulating the jet to increase or diminish the flow of steam through said jet and for locking the component parts together in adjusted position.

The invention consists essentially of a tubular member adapted for attachment to a steam hose and having a bell at its outer end and a conical disk mounted within the bell, as will be more fully described in the following specification and shown in the accompanying drawings, in which—

In the drawings like characters of reference indicate corresponding parts in each figure.

Figure 1:
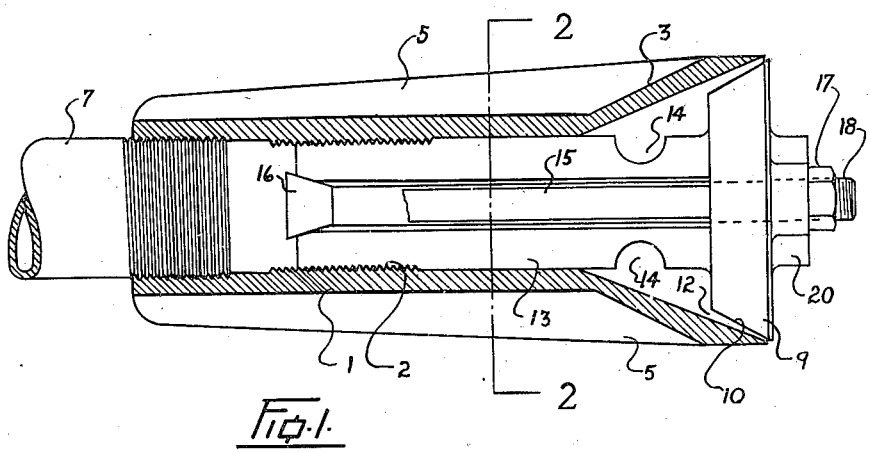
Fig. 1 is a longitudinal sectional view of the invention.
Figure 2:
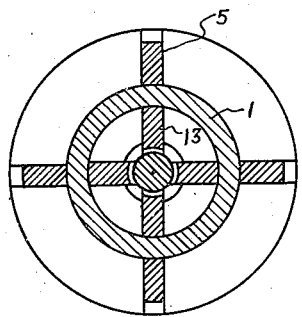
Fig. 2 is a transverse sectional view taken on the line 2—2 of Figure 1.

The numeral 1 indicates a tubular body having an internal thread 2 intermediate its length and a bell shaped enlargement 3 adjacent its outer end. The body is provided on its outer periphery with longitudinal webs 5 which are slightly tapered toward their rear ends, so as to allow a modicum of free lateral movement of the rear end of the invention within a boiler tube to be cleaned. The tubular body 1 is adapted to be attached to a pipe 7 which should be approximately the length of the longest tube to be cleaned.

A disk 9 having a conical rim 10 is concentrically held within the end of the enlargement 3, its rim is cut at an angle of about thirty degrees from the axis of the tubular body to define an annular steam passage 12 having a V-shaped cross section, so as to cause a high increase of steam velocity, as said steam flow passes to the outer side of said disk 9. The disk 9 is fitted with four radially extending guides 13, the free ends of which are threaded to engage the thread 2 of the tubular member 1. The guides 13 are cut away as at 14 to enable said guides to be outwardly urged by a central bolt 15 having a conical head 16, the bolt extends through the disk 9 and is fitted with a nut 17 upon its free or threaded end 18. In order to permit the disk 9 to be easily adjusted, a nut 20 is formed integrally with said disk so that the disk may be conveniently held immovable by a wrench at the time the nut 17 is being tightened upon the bolt.

In operation, the invention is placed in a tube and steam admitted to the tubular body through a suitable hose, not shown, and the pipe 7. The steam in passing through the passage 12 attains high velocity and exerts a cutting and lifting effect on the scale within the tube, thus breaking it loose as the device is moved towards its work, thus driving the soot and scale towards the end of the boiler where it is free to drop into an adjacent clean-out pit.

If the job necessitates a change in the steam flow through the passage 12, the nut 17 is slackened off and the disk 9 turned to widen or restrict the steam passage 12 as required, then the nut 17 is again tightened, thus causing the guides to be spread apart and to increase their grip on the thread 2 to lock the disk in adjusted position.

What we claim as our invention is:

1. A flue cleaner comprising a tubular body adapted for connection to a fluid pressure pipe, said tubular body having a conical enlargement at its outer end, a disk within the enlargement having a plurality of guides, said guides entering the tubular body and having threaded engagement therewith, said disk and the enlargement defining an annular passage, and means for spreading the guides to lock the disk in adjusted position within the enlargement.

2. A flue cleaner comprising a tubular body adapted for connection to a fluid pressure pipe, said tubular body having a conical enlargement at its outer end, a disk within the enlargement having a plurality of guides, said guides entering the tubular body and having threaded engagement therewith, said disk and the enlargement defining an annular passage, said guides being connected at one end to the disk and a bolt extending through the disk, said bolt having an enlarged head at its inner end adapted to engage and spread the guides to lock said disk in adjusted position within the enlargement.

FREDERICK L. LADE.
CHARLES J. SIMMONS.

REFERENCES CITED

The following references are of record in the file of this patent:

UNITED STATES PATENTS

| Number | Name | Date |
|---|---|---|
| 347,145 | Weitmyer | Aug. 10, 1886 |
| 354,204 | McLaughlin | Dec. 14, 1886 |
| 512,158 | Coggeshall | Jan. 2, 1894 |
| 606,093 | Semke | June 21, 1898 |